United States Patent
Patil et al.

(10) Patent No.: US 12,182,628 B2
(45) Date of Patent: *Dec. 31, 2024

(54) RECONFIGURABLE COMPUTING PODS USING OPTICAL NETWORKS

(71) Applicant: Google LLC, Mountain View, CA (US)

(72) Inventors: Nishant Patil, Sunnyvale, CA (US); Xiang Zhou, Sunnyvale, CA (US); Andrew Swing, Los Gatos, CA (US)

(73) Assignee: Google LLC, Mountain View, CA (US)

(*) Notice: Subject to any disclaimer, the term of this patent is extended or adjusted under 35 U.S.C. 154(b) by 19 days.

This patent is subject to a terminal disclaimer.

(21) Appl. No.: 18/075,332

(22) Filed: Dec. 5, 2022

(65) Prior Publication Data

US 2023/0161638 A1    May 25, 2023

Related U.S. Application Data

(63) Continuation of application No. 17/332,769, filed on May 27, 2021, now Pat. No. 11,537,443, which is a
(Continued)

(51) Int. Cl.
*G06F 9/50*        (2006.01)
*H04L 45/00*       (2022.01)
(Continued)

(52) U.S. Cl.
CPC ......... *G06F 9/5072* (2013.01); *G06F 9/5083* (2013.01); *H04L 45/02* (2013.01);
(Continued)

(58) Field of Classification Search
None
See application file for complete search history.

(56) References Cited

U.S. PATENT DOCUMENTS

| | | | | |
|---|---|---|---|---|
| 4,598,400 A | * | 7/1986 | Hillis | G06F 15/8023 370/400 |
| 6,853,635 B1 | * | 2/2005 | Beshai | G06F 15/17381 709/240 |

(Continued)

FOREIGN PATENT DOCUMENTS

| | | |
|---|---|---|
| CN | 104731796 | 6/2015 |
| CN | 106663030 | 5/2017 |

(Continued)

OTHER PUBLICATIONS

Clusterdesign.org [online], "Torus Networks Design" available on or before Sep. 7, 2013, retrieved on Apr. 17, 2019, retrieved from Internet: URL<https://clusterdesign.org/torus/>, 10 pages.
(Continued)

*Primary Examiner* — Kamal M Hossain
(74) *Attorney, Agent, or Firm* — Fish & Richardson P.C.

(57) ABSTRACT

Methods, systems, and apparatus, including an apparatus for generating clusters of building blocks of compute nodes using an optical network. In one aspect, a method includes receiving request data specifying requested compute nodes for a computing workload. The request data specifies a target n-dimensional arrangement of the compute nodes. A selection is made, from a superpod that includes a set of building blocks that each include an m-dimensional arrangement of compute nodes, a subset of the building blocks that, when combined, match the target n-dimensional arrangement specified by the request data. The set of building blocks are connected to an optical network that includes one or more optical circuit switches. A workload cluster of compute nodes that includes the subset of the building blocks is generated. The generating includes configuring, for each dimension of the workload cluster, respective routing data for the one or more optical circuit switches.

20 Claims, 11 Drawing Sheets

Related U.S. Application Data continuation of application No. 16/381,951, filed on Apr. 11, 2019, now Pat. No. 11,042,416.

(60) Provisional application No. 62/814,757, filed on Mar. 6, 2019.

(51) Int. Cl.
*H04L 45/02* (2022.01)
*H04L 47/125* (2022.01)
*H04L 67/563* (2022.01)
*H04Q 11/00* (2006.01)
*H04L 47/70* (2022.01)
*H04L 47/72* (2022.01)
*H04L 47/78* (2022.01)
*H04L 47/80* (2022.01)
*H04L 67/1008* (2022.01)

(52) U.S. Cl.
CPC ............ *H04L 45/46* (2013.01); *H04L 47/125* (2013.01); *H04L 67/563* (2022.05); *H04Q 11/0005* (2013.01); *H04Q 2011/0058* (2013.01)

(56) References Cited

U.S. PATENT DOCUMENTS

| | | | |
|---|---|---|---|
| 7,518,120 | B2 | 4/2009 | Monroe et al. |
| 8,159,973 | B2 | 4/2012 | Deng et al. |
| 8,260,840 | B1 | 9/2012 | Sirota et al. |
| 8,270,830 | B2 | 9/2012 | Kirkpatrick et al. |
| 8,296,419 | B1 | 10/2012 | Khanna et al. |
| 8,401,385 | B2 | 3/2013 | Spivey et al. |
| 8,687,975 | B2 | 4/2014 | Binkert et al. |
| 8,719,415 | B1 | 5/2014 | Sirota et al. |
| 8,811,378 | B2 | 8/2014 | Benner et al. |
| 8,867,915 | B1 | 10/2014 | Vahdat et al. |
| 8,909,047 | B2 | 12/2014 | Dress |
| 9,229,163 | B2 | 1/2016 | Schwetman, Jr. et al. |
| 9,465,632 | B2 | 10/2016 | Ebcioglu et al. |
| 9,479,219 | B1 | 10/2016 | Gandham et al. |
| 9,515,956 | B2 | 12/2016 | Hu et al. |
| 11,042,416 | B2 * | 6/2021 | Patil ........................ G06F 9/5027 |
| 11,122,347 | B2 * | 9/2021 | Willcock ............ H04Q 11/0062 |
| 11,537,443 | B2 * | 12/2022 | Patil ........................ G06F 9/5072 |
| 2002/0165962 | A1 | 11/2002 | Alvarez et al. |
| 2002/0176131 | A1 | 11/2002 | Walters et al. |
| 2004/0228629 | A1 | 11/2004 | Harris et al. |
| 2005/0251567 | A1 * | 11/2005 | Ballew .................... H04L 69/40 709/223 |
| 2006/0106931 | A1 * | 5/2006 | Richoux ............... G06F 9/4881 709/227 |
| 2006/0173983 | A1 * | 8/2006 | Naito ...................... G06F 15/16 709/223 |
| 2009/0024829 | A1 | 1/2009 | Deng et al. |
| 2009/0094436 | A1 * | 4/2009 | Deng ................... G06F 15/803 712/E9.003 |
| 2010/0042809 | A1 | 2/2010 | Schenfeld et al. |
| 2010/0254703 | A1 | 10/2010 | Kirkpatrick et al. |
| 2011/0010461 | A1 | 1/2011 | Lassila et al. |
| 2012/0128354 | A1 | 5/2012 | Panwar et al. |
| 2013/0156425 | A1 | 6/2013 | Kirkpatrick et al. |
| 2014/0119728 | A1 | 5/2014 | Zhang et al. |
| 2014/0149590 | A1 | 5/2014 | Mallipeddi et al. |
| 2016/0036555 | A1 | 2/2016 | Hua et al. |
| 2018/0103088 | A1 | 4/2018 | Blainey et al. |
| 2018/0329752 | A1 | 11/2018 | Kokubo et al. |
| 2019/0158939 | A1 | 5/2019 | Frankel et al. |
| 2019/0235929 | A1 * | 8/2019 | Altstaetter ............ H04L 12/427 |
| 2021/0006873 | A1 | 1/2021 | Willcock |

FOREIGN PATENT DOCUMENTS

| | | |
|---|---|---|
| CN | 106851442 | 6/2017 |
| CN | 107094270 | 8/2017 |
| CN | 107241660 | 10/2017 |
| CN | 107710702 | 2/2018 |
| CN | 108075835 | 5/2018 |
| CN | 109416648 | 3/2019 |
| EP | 1580661 | 9/2005 |
| JP | 2006-146864 | 6/2006 |
| JP | 2016-504668 | 2/2016 |
| JP | 2016-091069 | 5/2016 |
| JP | 2017-527031 | 9/2017 |
| KR | 20070086231 | 8/2007 |
| KR | 10-2010-0122870 | 11/2010 |
| KR | 20130033898 | 4/2013 |
| KR | 101465420 | 11/2014 |
| KR | 10-2016-0024747 | 3/2016 |
| KR | 10-2016-0099473 | 8/2016 |

OTHER PUBLICATIONS

Hemsoth, "3D Torus Topology with InfiniBand at San Diego Supercomputing Center" Jan. 30, 2012, [Nov. 15, 2018] Retrieved from Internet: URL<https://www.hpcwire.com/2012/01/30/3d_torus_topolgy_with_infiniband_at_san_diego_supercomputing_center/>, 8 pages.

International Preliminary Report on Patentability in International Appln. No. PCT/US2019/067100, mailed on Aug. 25, 2021, 9 pages.

International Search Report and Written Opinion in International Appln. No. PCT/US2019/067100, mailed on Apr. 14, 2020, 14 pages.

Kash et al., "IntraChip Optical Networks for a Future Supercomputer-on-a-Chip" IEEE Photonics in Switching, Aug. 19-22, 2007, 2 pages.

Koibuchi et al., "Optical networks technologies for HPC: computer-architects point of view" IEICE Electronics Express, vol. 13, No. 6, Mar. 25, 2016, 14 pages.

Notice of Allowance in Japanese Appln. No. 2021-522036, dated Feb. 7, 2023, 5 pages (with English translation).

Office Action in European Appln. No. 19839305.0, dated Mar. 24, 2023, 7 pages.

Office Action in Japanese Appln. No. 2021-522036, dated Aug. 23, 2022, 7 pages (with English translation).

Office Action in Korean Appln. No. 10-2021-7011905, dated Feb. 22, 2023, 31 pages (with English translation).

Schares et al., "A reconfigurable interconnect fabric with optical circuit switch and software optimizer for stream computing systems" Optical Society of America, Mar. 2009, 3 pages.

Shu et al., "Programmable OPS/OCS hybrid data centre networks," Optical Fiber Technology, vol. 44, Aug. 2018, 26 pages.

Takken et al., "The future of optics in supercomputers (Abstract of Keynote speech)" 2013 IEEE 22nd Conference on Electrical Performance of Electronic Packaging and Systems, Oct. 27-30, 2013, 1 page.

Miao et al., "Towards Petabit/s All-Optical Flat Data Center Networks Based on WDM Optical Cross-Connect Switches with Flow Control" Journal of Lightwave Technology 34.17, Jul. 2016, 4066-4075.

Notice of Allowance in Chinese Appln. No. 201980069191.8, mailed on Nov. 24, 2023, 7 pages (with English translation).

Wu et al., "Resource Coordinated Scheduling Strategy Supporting Multi-Channel Transmission in Optical Grid" Journal of Beijing University of Posts and Telecommunications vol. 33, No. 2, Apr. 2010, 5 pages (with English abstract).

Zhao Yang, "Study on Key Technologies of IP and Optical Transport Network Uniform Control Based on OpenFlow" Feb. 15, 2018, 123 pages (with English abstract).

Notice of Allowance in Korean Appln. No. 10-2021-7011905, mailed on Aug. 21, 2023, 4 pages (with English translation).

Office Action in Chinese Appln. No. 201980069191.8, mailed on Aug. 19, 2023, 20 pages (with English translation).

Notice of Allowance in Korean Appln. No. 10-2023-7032481, mailed on Oct. 10, 2023, 3 pages (with English translation).

* cited by examiner

RECONFIGURABLE COMPUTING PODS USING OPTICAL NETWORKS

CROSS-REFERENCE TO RELATED APPLICATIONS

This application is a continuation application of, and claims priority to, U.S. patent application Ser. No. 17/332,769, titled RECONFIGURABLE COMPUTING PODS USING OPTICAL NETWORKS, filed on May 27, 2021, which is a continuation application of U.S. patent application Ser. No. 16/381,951, titled RECONFIGURABLE COMPUTING PODS USING OPTICAL NETWORKS, filed on Apr. 11, 2019, and now U.S. Pat. No. 11,042,416, which application claims the benefit under 35 U.S.C. § 119(e) of U.S. Patent Application No. 62/814,757, titled RECONFIGURABLE COMPUTING PODS USING OPTICAL NETWORKS, filed Mar. 6, 2019. The disclosures of the foregoing applications are incorporated herein by reference in their entirety for all purposes.

BACKGROUND

Some computational workloads, such as machine learning training, require a large number of processing nodes to complete the workloads efficiently. The processing nodes can communicate with each other over interconnection networks. For example, in machine learning training, the processing nodes can communicate with each other to converge on an optimal deep learning model. The interconnect networks are critical to the speed and efficiency at which the processing units achieve convergence.

As machine learning and other workloads vary in size and complexity, rigid structures of super computers that include multiple processing nodes can limit the availability, scalability, and performance of the super computers. For example, if some processing nodes of a super computer that has a rigid interconnect network that connects a specific arrangement of processing nodes fail, the super computer may not be able to replace these processing nodes, resulting in reduced availability and performance. Some specific arrangements can also result in higher performance than other arrangements independent of failed nodes.

SUMMARY

This specification describes technologies relating to reconfigurable superpods of compute nodes from which workload clusters are generated using optical networks.

In general, one innovative aspect of the subject matter described in this specification can be embodied in methods that include receiving request data specifying requested compute nodes for a computing workload. The request data specifies a target n-dimensional arrangement of the compute nodes, where n is greater than or equal to two. A selection is made, from a superpod that includes a set of building blocks that each include an m-dimensional arrangement of compute nodes, a subset of the building blocks that, when combined, match the target n-dimensional arrangement specified by the request data, wherein m is greater than or equal to two. The set of building blocks are connected to an optical network that includes one or more optical circuit switches for each of the n-dimensions. A workload cluster of compute nodes that includes the subset of the building blocks is generated. The generating includes configuring, for each dimension of the workload cluster, respective routing data for the one or more optical circuit switches for the dimension. The respective routing data for each dimension of the workload cluster specifies how data of the computing workload is routed between compute nodes along the dimension of the workload cluster. The compute nodes of the workload cluster are caused to execute the computing workload.

These and other implementations can each optionally include one or more of the following features. In some aspects, the request data specifies different types of compute nodes. Selecting the subset of building blocks can include selecting, for each type of compute node specified by the request data, a building block that includes one or more compute nodes of the specified type.

In some aspects, the respective routing data for each dimension of the superpod includes an optical circuit switch routing table for one of the one or more optical circuit switches. In some aspects, the optical network includes, for each of the n dimensions, one or more optical circuit switches of the optical network that route data between compute nodes along the dimension. Each building block can include multiple segments of compute nodes along each dimension of the building blocks. The optical network can include, for each segment of each dimension, an optical circuit switch of the optical network that routes data between the corresponding segments of compute nodes of each building block in the workload cluster.

In some aspects, each building block includes one of a three-dimensional torus of compute nodes or a mesh of compute nodes. In some aspects, the superpod includes multiple workload clusters. Each workload cluster can include a different subset of the building blocks and execute different workloads than each other workload cluster.

Some aspects include receiving data indicating that a given building block of the workload cluster has failed and replacing the given building block with an available building block. Replacing the given building block with an available building block can include updating routing data of one or more optical circuit switches of the optical network to stop routing data between the given building block and one or more other building blocks of the workload cluster and updating routing data of the one or more optical circuit switches of the optical network to route data between the available building block and the one or more other building blocks of the workload cluster.

In some aspects, selecting the subset of the building blocks that, when combined, match the target n-dimensional arrangement specified by the request data includes determining that the n-dimensional arrangement specified by the request data requires a first quantity of building blocks that exceeds a second quantity of healthy available building blocks in the superpod and in response to determining that the n-dimensional arrangement specified by the request data requires the first quantity of building blocks that exceeds the second quantity of healthy available building blocks in the superpod: identifying one or more second computing workloads that have a lower priority than the computing workload and that are being executed by other building blocks of the superpod and reassigning one or more building blocks of the one or more second computing workloads to the workload cluster for the computing workload. Generating the workload cluster of compute nodes that includes the subset of the building blocks can include including the one or more building blocks of the one or more second computing workloads in the subset of the building blocks.

In some aspects, generating the workload cluster of compute nodes that includes the subset of the building blocks includes reconfiguring, for each dimension of the workload cluster, respective routing data for the one or more optical circuit switches for the dimension such that each of the one or building blocks of the one or more second computing workloads communicates with other building blocks of the workload cluster rather than building blocks of the one or more second computing workloads.

The subject matter described in this specification can be implemented in particular embodiments so as to realize one or more of the following advantages. Using optical networks to dynamically configure clusters of compute nodes for workloads results in higher availability of the compute nodes as other compute nodes can be easily substituted for faulty or offline compute nodes. The flexibility in the arrangement of the compute nodes results in higher performance of the compute nodes and more efficiency allocating the appropriate number and arrangement of compute nodes optimized (or improved) for each workload. With superpods that include multiple types of compute nodes, workload clusters can be generated that include not only the appropriate number and arrangement of compute nodes, but also the appropriate types of compute nodes for each workload, e.g., without being limited to only compute nodes that are physically close to each other in a datacenter or other location.

Using optical networks to configure the pods also provides fault isolation and better security for the workloads. For example, some conventional super computers route traffic between the various computers that make up the supercomputer. If one of the computers fail, that path of communication is lost. Using optical networks, the data can be rerouted quickly and/or an available compute node can replace the failed compute node. In addition, the physical isolation between workloads provided by optical circuit switching (OCS) switches, e.g., the physical isolation of different light paths, provides better security between the various workloads executing in a same superpod than using vulnerable software to manage the separation.

Using optical networks to connect building blocks can also reduce latency in transmitting data between the building blocks relative to packet switched networks. For example, in packet switching, there is extra latency as the packet needs to be received by the switch, buffered, and sent out again on another port. Using OCS switches to connect building blocks provides a true end-to-end light path with no packet switching or buffering in the middle.

Various features and advantages of the foregoing subject matter is described below with respect to the figures. Additional features and advantages are apparent from the subject matter described herein and the claims.

BRIEF DESCRIPTION OF THE DRAWINGS

Like reference numbers and designations in the various drawings indicate like elements.

DETAILED DESCRIPTION

Figure 1:
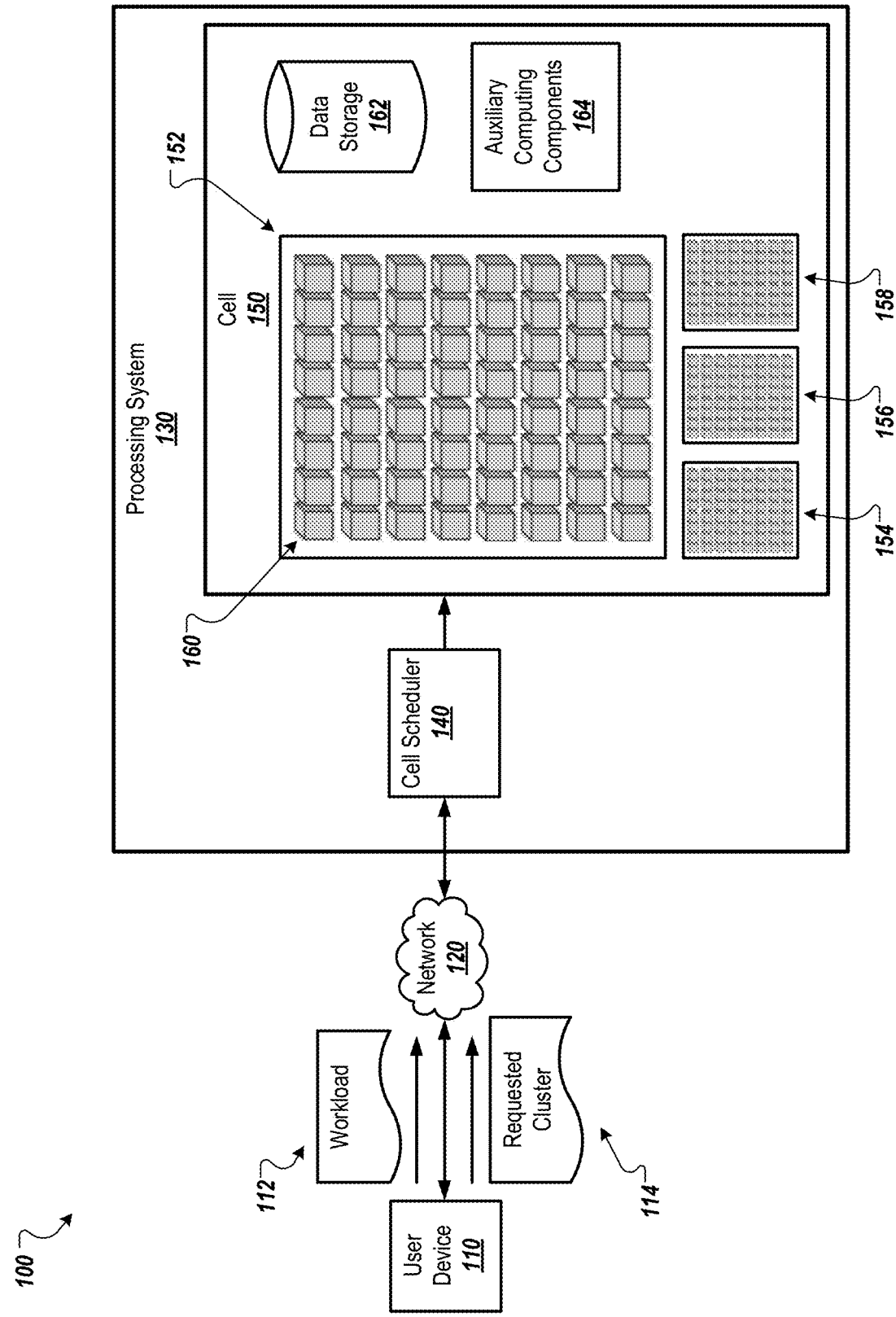
FIG. 1 is a block diagram of an environment in which an example processing system generates workload clusters of compute nodes and executes computing workloads using the workload clusters.

In general, systems and techniques described herein can configure an optical network fabric to generate workload clusters of compute nodes from a superpod that includes multiple building blocks of compute nodes that are connected via the optical network. For example, a superpod can include a set of interconnected building blocks. Each building block can include multiple compute nodes that are in an m-dimensional arrangement, such as a two-dimensional or three-dimensional arrangement.

A user can specify a target arrangement of compute nodes for a particular workload. For example, the user can provide a machine learning workload and specify a target arrangement of compute nodes to perform the machine learning computations. The target arrangement can define the number of compute nodes across each of n dimensions, e.g., where n is greater than or equal to two. That is, the target arrangement can define the size and shape of the workload cluster. For example, some machine learning models and computations perform better on non-square topologies.

The cross-sectional bandwidth can also become a limitation on the compute throughout, e.g., compute nodes waiting on data transfer leaving idle compute cycles. Depending on how the work is allocated across compute nodes, and how much data needs to be transferred across the network in various dimensions, the shape of the workload cluster can have an impact on the performance of the compute nodes in the workload cluster.

For workloads that will have all compute node to all compute node data traffic, a cube-shaped workload cluster would minimize the number of hops between compute nodes. If a workload has a lot of local communication and then transferred data to an adjacent set of compute nodes in across a particular dimension, and the workload calls for many of these neighboring communications chained together, the workload may benefit from an arrangement that has more compute nodes in the particular dimension than in the other dimensions. Thus, enabling users to specify the arrangement of the compute nodes in a workload cluster allows the users to specify arrangements that may result in better performance for their workloads.

If different types of compute nodes are included in a superpod, the request can also specify the number of each type of compute node to include in the workload cluster. This allows users to specify an arrangement of compute nodes that performs better for the particular workload.

A workload scheduler can select building blocks for the workload cluster, e.g., based on the availability of the building blocks, the health (e.g., working or failed) of the building blocks, and/or a priority of workloads in the superpod (e.g., a priority of workloads that are or will be executed by compute nodes of the superpod). The workload scheduler can provide data identifying the selected building blocks and the target arrangement of the building blocks to an optical circuit switching (OCS) manager. The OCS manager can then configure one or more OCS switches of the optical network to connect the building blocks together to form the workload cluster. The workload scheduler can then execute the computing workload on the compute nodes of the workload cluster.

If one of the building blocks of the workload cluster fails, the failed building block can be replaced with another building block quickly by simply reconfiguring the OCS switches. For example, the workload scheduler can select an available building block in the superpod to replace the failed building block. The workload scheduler can instruct the OCS manager to replace the failed building block with the selected building block. The OCS manager can then reconfigure the OCS switches such that the selected building block is connected to the other building blocks of the workload cluster and such that the failed building block is no longer connected to the building blocks of the workload cluster.

FIG. 1 is a block diagram of an environment 100 in which an example processing system 130 generates workload clusters of compute nodes and executes computing workloads using the workload clusters. The processing system 130 can receive computing workloads 112 from user devices 110 over a data communication network 120, e.g., a local area network (LAN), a wide area network (WAN), the Internet, a mobile network, or a combination thereof. Example workloads 112 include software applications, machine learning models, e.g., training and/or using the machine learning models, encoding and decoding videos, and digital signal processing workloads, to name just a few.

A user can also specify a requested cluster 114 of compute nodes for the workload 112. For example, the user can specify a target shape and size of the cluster of requested cluster of compute nodes. That is, the user can specify a quantity of compute nodes and a shape of the compute nodes across multiple dimensions. For example, if the compute nodes are distributed across three dimensions, x, y, and z, the user can specify a number of compute nodes in each dimension. The user can also specify one or more types of compute nodes to include in the cluster. As described below, the processing system 130 can include different types of compute nodes.

As described below, the processing system 130 can generate a workload cluster that matches the target shape and size of the cluster using building blocks. Each building block can include multiple compute nodes arranged in m dimensions, e.g., three dimensions. Thus, the user can specify the target shape and size in terms of a quantity of building blocks in each of the multiple dimensions. For example, the processing system 130 can provide, to the user devices 110, a user interface that enables the users to select up to a maximum number of building blocks in each dimension.

The user device 110 can provide the workload 112 and data specifying the requested cluster 114 to the processing system 130. For example, the user device 110 can provide request data that includes the workload 112 and the data specifying the requested cluster 114 to the processing system 130 over the network 120.

The processing system 130 includes a cell scheduler 140 and one or more cells 150. A cell 150 is a group of one or more superpods. For example, the illustrated cell 150 includes four superpods 152-158. Each superpod 152-158 includes a set of building blocks 160, also referred to herein as a pool of building blocks. In this example, each superpod 152-158 includes 64 building blocks 160. However, the superpods 152-158 can include other quantities of building blocks 160, e.g., 20, 50, 100, or another appropriate quantity. The superpods 152-158 can also include different quantities of building blocks 160. For example, the superpod 152 can include 64 building blocks, while the superpod 152 includes 100 building blocks.

As described in more detail below, each building block 160 can include multiple compute nodes arranged in two or more dimensions. For example, a building block 160 can include 64 compute nodes arranged along three dimensions with four compute nodes in each dimension. This arrangement of compute nodes is referred to in this document as a 4×4×4 building block with four compute nodes along the x dimension, four compute nodes along the y dimension and four compute nodes along the z dimension. Other quantities of dimensions, e.g., two dimensions, and other quantities of compute nodes in each dimension are also possible, such as 3×1, 2×2×2, 6×2, 2×3×4, etc.

A building block could also include a single compute node. However, as described below, to generate a workload cluster, optical links between building blocks are configured to connect the building blocks together. Thus, although smaller building blocks, e.g., building blocks with a single compute node, can provide more flexibility in generating workload clusters, the smaller building blocks can require more OCS switch configurations and more optical network components (e.g., cables and switches). The number of compute nodes in building blocks can be selected based on a tradeoff between the desired flexibility of the workload clusters and the requirements of connecting the building blocks together to form the workload clusters and the required number of OCS switches.

Each compute node of the building blocks 160 can include an application-specific integrated circuit (ASIC), e.g., a tensor processing unit (TPU) for a machine learning workload, a graphics processing unit (GPU), or other type of processing unit. For example, each compute node can be a single processor chip that includes a processing unit.

In some implementations, all building blocks 160 in a superpod have the same compute nodes. For example, the superpod 152 can include 64 building blocks that each have 64 TPUs in a 4×4×4 arrangement for executing machine learning workloads. A superpod can also include different types of compute nodes. For example, the superpod 154 can include 60 building blocks that have TPUs and 4 building blocks that have special purpose processing units that perform tasks other than the machine learning workloads. In this way, the workload clusters for a workload can include different types of compute nodes. The superpod can include multiple building blocks of each type of compute node in the superpod for redundancy and/or to allow multiple workloads to run in the superpod.

In some implementations, all building blocks 160 in a superpod have the same arrangement, e.g., the same size and shape. For example, each building block 160 of the superpod 152 can have a 4×4×4 arrangement. A superpod can also have building blocks with different arrangements. For example, the superpod 154 can have 32 Building blocks in 4×4×4 arrangements and 32 building blocks in a 16×8×16 arrangement. The different building block arrangements can have the same or different compute nodes. For example, the building blocks that have TPUs may have a different arrangement then the building blocks that have GPUs.

A superpod can have different hierarchies of building blocks. For example, the superpod 152 can include base level building blocks that have a 4×4×4 arrangement. The superpod 152 can also include intermediate level building blocks that have more compute nodes. For example, the intermediate level building blocks can have an 8×8×8 arrangement, e.g., made of eight base level building blocks. In this way, larger workload clusters can be generated using the intermediate level building blocks with less link configuration than if the base level building blocks were connected to generate the larger workload clusters. Also having the base level building blocks in the superpod allows for flexibility for the smaller workload clusters that may not require the quantity of compute nodes in the intermediate level building blocks.

The superpods 152-158 within a cell 150 can have the same or different types of compute nodes in the building blocks. For example, a cell 150 can include one or more superpods that have TPU building blocks and one or more superpods that have GPU building blocks. The size and shape of the building blocks can also be the same or different in the different superpods 152-158 of a cell 150.

Each cell 150 also includes shared data storage 162 and shared auxiliary computing components 164. Each superpod 152-158 in the cell 150 can use the shared data storage 162, e.g., to store data generated by the workloads executing in the superpods 152-158. The shared data storage 162 can include hard drives, solid state drives, flash memory, and/or other appropriate data storage devices. The shared auxiliary computing components can include CPUs (e.g., general-purpose CPU machines), GPUs, and/or other accelerators (e.g., video decoding, image decoding, etc.) that are shared within a cell 150. The auxiliary computing components 164 can also include storage appliances, memory appliances, and/or other computing components that can be shared by the compute nodes over a network.

The cell scheduler 140 can select a cell 150 and/or a superpod 152-158 of a cell 150 for each workload received from a user device 110. The cell scheduler 140 can select a superpod based on the target arrangement specified for the workload, the availability of the building blocks 160 in the superpods 152-158, and the health of the building blocks in the superpods 152-158. For example, the cell scheduler 140 can select, for the workload, a superpod that includes at least a sufficient quantity of available and healthy building blocks to generate a workload cluster that has the target arrangement. If the request data specifies a type of compute node, the cell scheduler 140 can select a superpod that has at least a sufficient quantity of available and healthy building blocks that have the specified type of compute node.

As described below, each superpod 152-158 can also include a workload scheduler and an OCS manager. When the cell scheduler 140 selects a superpod of a cell 150, the cell scheduler 140 can provide the workload and the data specifying the requested cluster to the workload scheduler of that superpod 150. As described in more detail below, the workload scheduler can select, from the building blocks of the superpod, a set of building blocks to connect to form a workload cluster based on the availability and health of the building blocks, and optionally a priority of workloads in the superpod. For example, as described below, if the workload scheduler receives a request for a workload cluster that includes more building blocks than the number of building blocks in the superpod that are healthy and available, the workload scheduler can reassign building blocks of lower priority workloads to the requested workload cluster. The workload scheduler can provide data identifying the selected building blocks to an OCS manager. The OCS manager can then configure one or more OCS switches to connect the building blocks together to form the workload cluster. The workload scheduler can then execute the workload on the compute nodes of the workload cluster.

In some implementations, the cell scheduler 140 balances loads between various cells 150 and superpods 152-158, e.g., when selecting superpods 152-158 for the workloads. For example, when selecting between two or more superpods that have the capacity of building blocks for a workload, the cell scheduler 140 can select the superpod that has the most capacity, e.g., the most available and healthy building blocks, or a superpod of a cell that has the most overall capacity.

In some implementations, the cell scheduler 140 can also determine the target arrangement for a workload. For example, the cell scheduler 140 can determine the target arrangement of building blocks based on an estimated computational demand of the workload and the throughput of one or more types of available compute nodes. In this example, the cell scheduler 140 can provide the determined target arrangement to the workload scheduler of the superpod.

Figure 2:
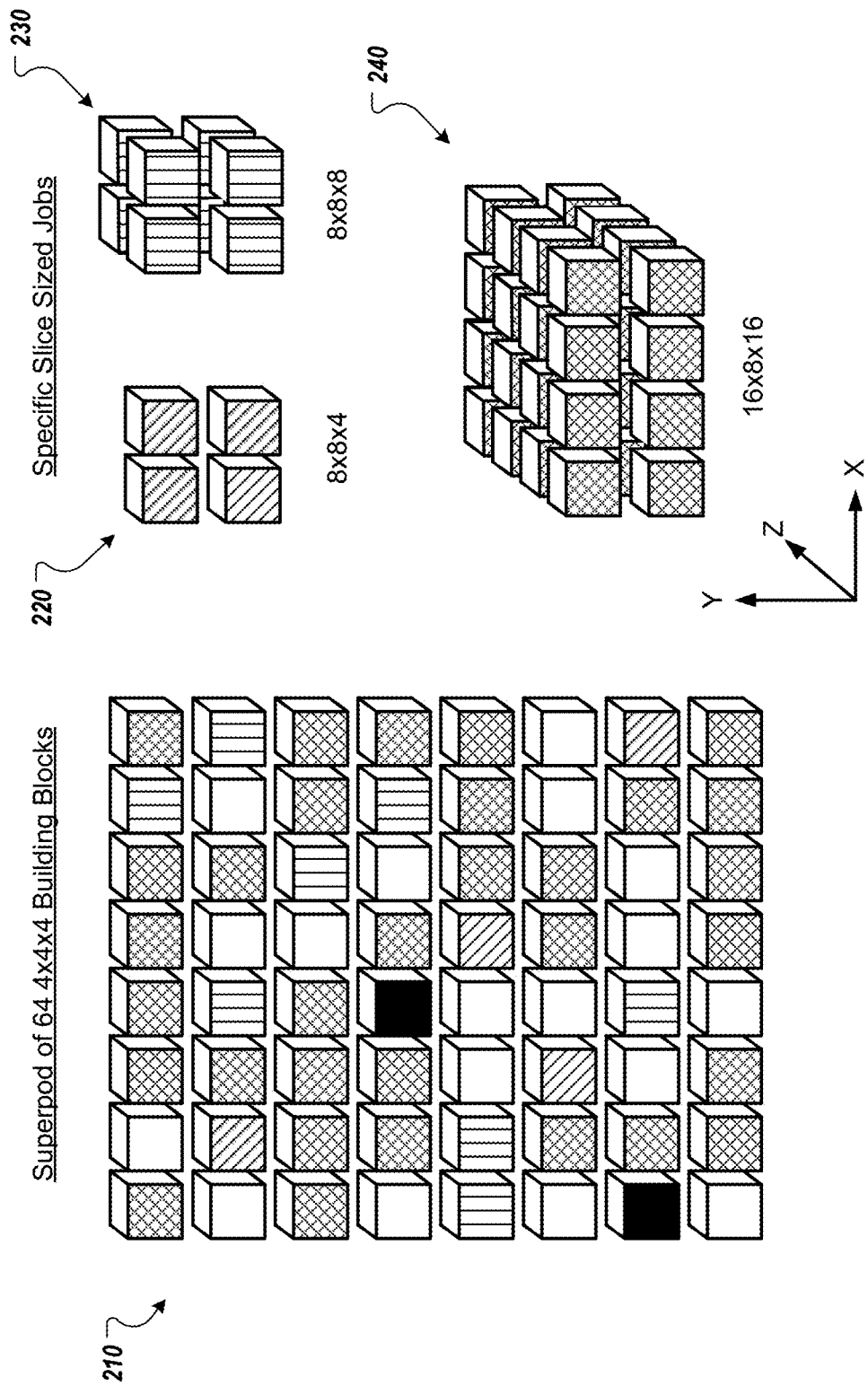
FIG. 2 illustrates an example logical superpod and example workload clusters generated from a portion of the building blocks in the superpod.

FIG. 2 illustrates an example logical superpod 210 and example workload clusters 220, 230, and 240 generated from a portion of the building blocks in the superpod 210. In this example, the superpod 210 includes 64 building blocks that each have a 4×4×4 arrangement. Although many of the examples described in this document are described in terms of 4×4×4 building blocks, the same techniques can be applied to other arrangements of building blocks.

In the superpod 210, the building blocks represented with hatching are assigned to a workload, as described below. The building blocks represented with solid white are healthy available building blocks. The building blocks represented with solid black are unhealthy nodes that cannot be used to generate a workload cluster, e.g., due to a failure.

The workload cluster 220 is an 8×8×4 pod that includes four of the 4×4×4 building blocks from the superpod 210. That is, the workload cluster 220 has eight compute nodes along the x-dimension, eight compute nodes along the y-dimension, and four compute nodes along the z-dimension. As each building block has four compute nodes along each dimension, the workload cluster 220 includes two building blocks along the x-dimension, two building blocks along the y-dimension, and one building block along the z-dimension.

The four building blocks of the workload cluster 220 are depicted with diagonal hatching to illustrate their positions in the superpod 210. As illustrated, the building blocks of the workload cluster 220 are not adjacent to one another. As described in more detail below, the use of the optical network enables workload clusters to be generated from any combination of workload clusters in the superpod 210 irrespective of their relative positions in the superpod 210.

The workload cluster 230 is an 8×8×8 pod that includes eight of the building blocks of the superpod 210. In particular, the workload cluster includes two building blocks along each dimension, which gives the workload cluster 230 eight compute nodes along each dimension. The building blocks of the workload cluster 230 are depicted with vertical hatching to illustrate their positions in the superpod 210.

The workload cluster 240 is a 16×8×16 pod that includes 32 of the building blocks of the superpod 210. In particular, the workload cluster 240 includes four building blocks along the x-dimension, two building blocks along the y-dimension, and four building blocks along the z-dimension, which gives the workload cluster 16 compute nodes along the x-dimension, eight compute nodes along the y-dimension, and 16 compute nodes along the z-dimension. The building blocks of the workload cluster 240 are depicted with cross hatching to illustrate their positions in the superpod 210.

The workload clusters 220, 230, and 240 are just some examples of the clusters of the superpod 210 that can be generated for workloads. Many other arrangements of workload clusters are also possible. Although the example workload clusters 220, 230, and 240 have a rectangular shape, other shapes are also possible.

The shapes of the workload clusters, including the workload clusters 220, 230 and 240, are logical shapes rather than physical shapes. The optical network is configured such that the building blocks communicate along each dimension as if the workload clusters were physically connected in the logical configuration. However, the physical building blocks and their corresponding compute nodes can be arranged physically in a data center in various ways. The building blocks of the workloads 220, 230, and 240 can be selected from any of the healthy available building blocks without any constraint on the physical relationship between the building blocks in the superpod 210 except that the building blocks all be connected to the optical network for the superpod 210. For example, as described above and illustrated in FIG. 2, the workload clusters 220, 230, and 240 include physically non-adjacent building blocks.

In addition, the logical arrangement of the workload clusters are not constrained by the physical arrangement of the building blocks of the superpod. For example, the building blocks can be arranged in eight rows and eight columns, with only one building block along the z-dimension. However, a workload cluster can be configured such that the workload clusters includes multiple building blocks along the z-dimension by configuring the optical network to create this logical arrangement.

Figure 3:
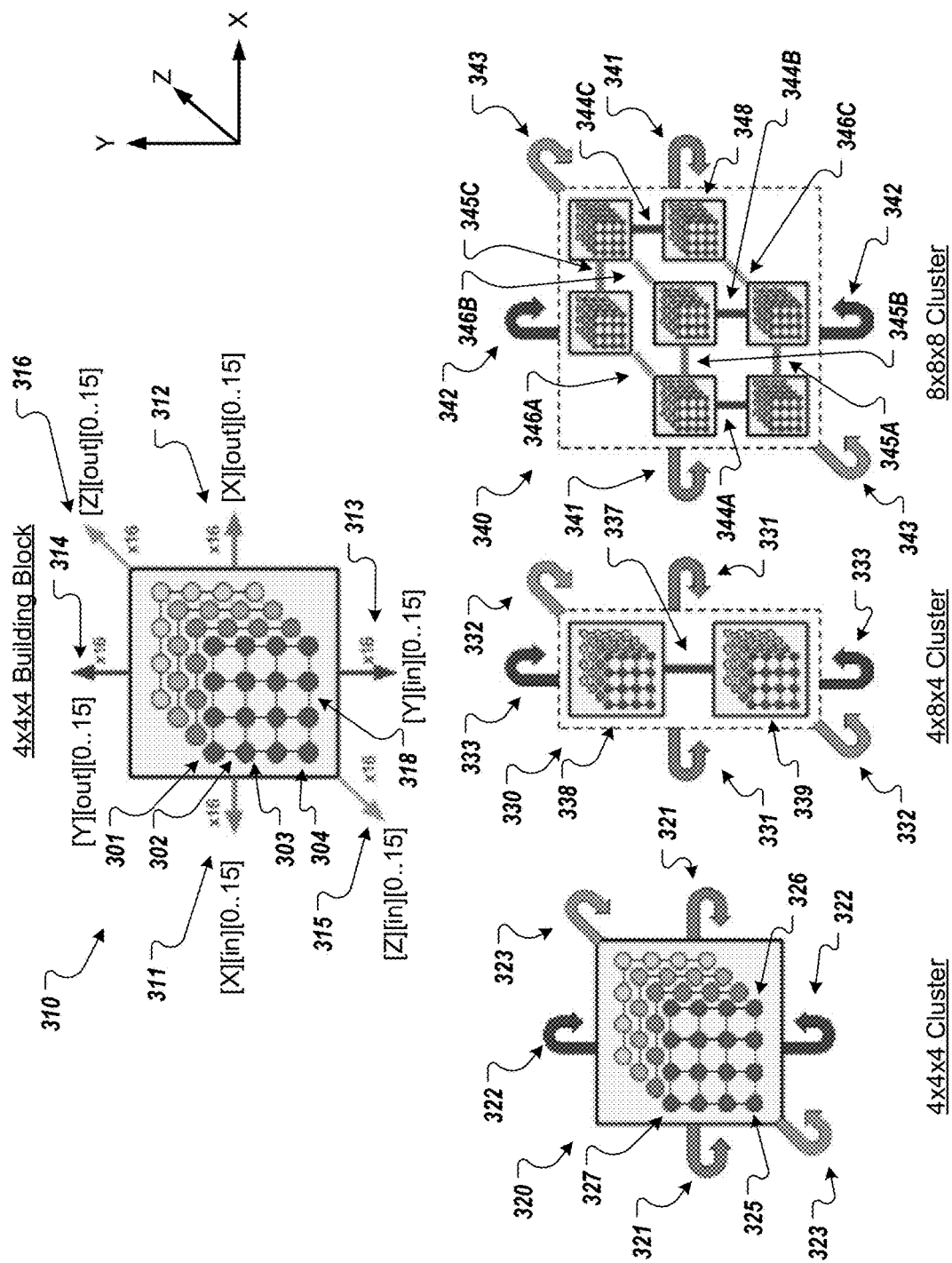
FIG. 3 illustrates an example building block and example workload clusters generated using the building block.

FIG. 3 illustrates an example building block 310 and example workload clusters 320, 330, and 340 generated using the building block 310. The building block 310 is a 4×4×4 building block with four compute nodes along each dimension. In this example, each dimension of the building block 310 includes 16 segments of four compute nodes in each segment. For example, there are 16 compute nodes on the top of the building block 310. For each of these 16 compute nodes, there is a segment along the y-dimension that includes the compute node and three other compute nodes including a corresponding last compute node on the bottom of the building block 310. For example, one segment along the y-dimension includes compute nodes 301-304.

The compute nodes within the building block 310 can be connected to each other with internal links 318 made of conductive material, e.g., copper cables. The compute nodes in each segment of each dimension can be connected using the internal links 318. For example, there is an internal link 318 that connects compute node 301 to compute node 302. There is also an internal link 318 that connects compute node 302 to compute node 303, and another internal link 318 that connects compute node 303 to compute node 304. The compute nodes in each other segment can be connected in the same way to provide internal data communication between the compute nodes of the building block 310.

The building block 310 also includes external links 311-316 that connect the building block 310 to an optical network. The optical network connects the building block 310 to other building blocks. In this example, the building block 310 includes 16 external input links 311 for the x-dimension. That is, the building block 310 includes an external input link 311 for each of the 16 segments along the x-dimension. Similarly, the building block 310 includes an external output link 312 for each segment along the x-dimension, an external input link 313 for each segment along the y-dimension, an external output link 314 for each segment along the y-dimension, an external input link 315 for each segment along the z-dimension, and an external output link 316 for each segment along the z-dimension. As some arrangements of building blocks can have more than three dimensions, such as a torus, a building block 310 can include similar external links for each dimension of the building block 310.

Each external link 311-316 can be an optical fiber link that connects a compute node on its corresponding segment of compute nodes to the optical network. For example, each external link 311-316 can connect its compute node to an OCS switch of the optical network. As described below, the optical network can include one or more OCS switches for each dimension for which the building blocks 310 have a segment. That is, the external links 311 and 312 for the x-dimensional can be connected to different OCS switch(es) than the external links 313 and 314. The OCS switches can be configured to connect the building block to other building blocks to form workload clusters, as described in more detail below.

The building block 310 is in the form of a 4×4×4 mesh arrangement. Other arrangements are also possible for a 4×4×4 (or other size building block). For example, a building block 310 can be in the form of a three-dimensional torus with wrap-around torus links, similar to the workload cluster 320. The workload cluster 320 can also be generated from a single mesh building block 310 by configuring the optical network to provide wrap-around torus links 321-323.

The torus links 321-323 provide wrap around data communication between one end of each segment and the other end of each segment. For example, the torus links 321 connects the compute node at each end of each segment along the x-dimension to the corresponding compute node at the other end of the segment. The torus links 321 can include a link that connects compute node 325 to compute node 326. Similarly, the torus links 322 can include a link that connects compute node 325 to compute node 327.

The torus links 321-323 can be conductive cables, e.g., copper cables, or optical links. For example, the optical links of the torus links 321-323 can connect their corresponding computer nodes to one or more OCS switches. The OCS switches can be configured to route data from one end of each segment to the other end of each segment. The building block 310 can include an OCS switch for each dimension. For example, the torus links 321 can be connected to a first OCS switch that routes data between one end of each segment along the x-dimension and the other end of each segment along the x-dimension. Similarly, the torus links 322 can be connected to a second OCS switch that routes data between one end of each segment along the y-dimension and the other end of each segment along the y-dimension. The torus links 322 can be connected to a third OCS switch that routes data between one end of each segment along the z-dimension and the other end of each segment along the z-dimension.

The workload cluster 330 includes two building blocks 338 and 339 that form a 4×8×4 pod. Each building block 338 and 339 can be the same as the building block 310 or the workload cluster 320. The two building blocks are connected along the y-dimension using external links 337. For example, one or more OCS switches can be configured to route data between the y-dimension segments of the building block 338 and the y-dimension segments of the building block 339.

In addition, one or more OCS switches can be configured to provide wrap around links 331-333 between one end of each segment and the other end of each segment along all three dimensions. In this example, the wrap around links 333 connect one end of the y-dimension segments of the building block 338 to one end of the y-dimension segments of the building block 339 to provide full wrap around communication for the y-dimension segments formed by the combination of the two building blocks 338 and 339.

The workload cluster 340 includes eight building blocks (one not shown) that form an 8×8×8 cluster. Each building block 348 can be the same as the building block 310. The building block links that are connected along the x-dimension are connected using external links 345A-345C. Similarly, the building block links that are connected along the y-dimension are connected using external links 344A-344C, and the building blocks that are connected along the z-dimension are connected using external links 346A-346C. For example, one or more OCS switches can be configured to route data between the x-dimension segments, one or more OCS switches can be configured to route data between the y-dimension segments, and one or more OCS switches can be configured to route data between the z-dimension segments. There are additional external links each dimension that connects the building block that is not illustrated in FIG. 3 to adjacent building blocks. In addition, one or more OCS switches can be configured to provide wrap around links 341-343 between one end of each segment and the other end of each segment along all three dimensions.

Figure 4:
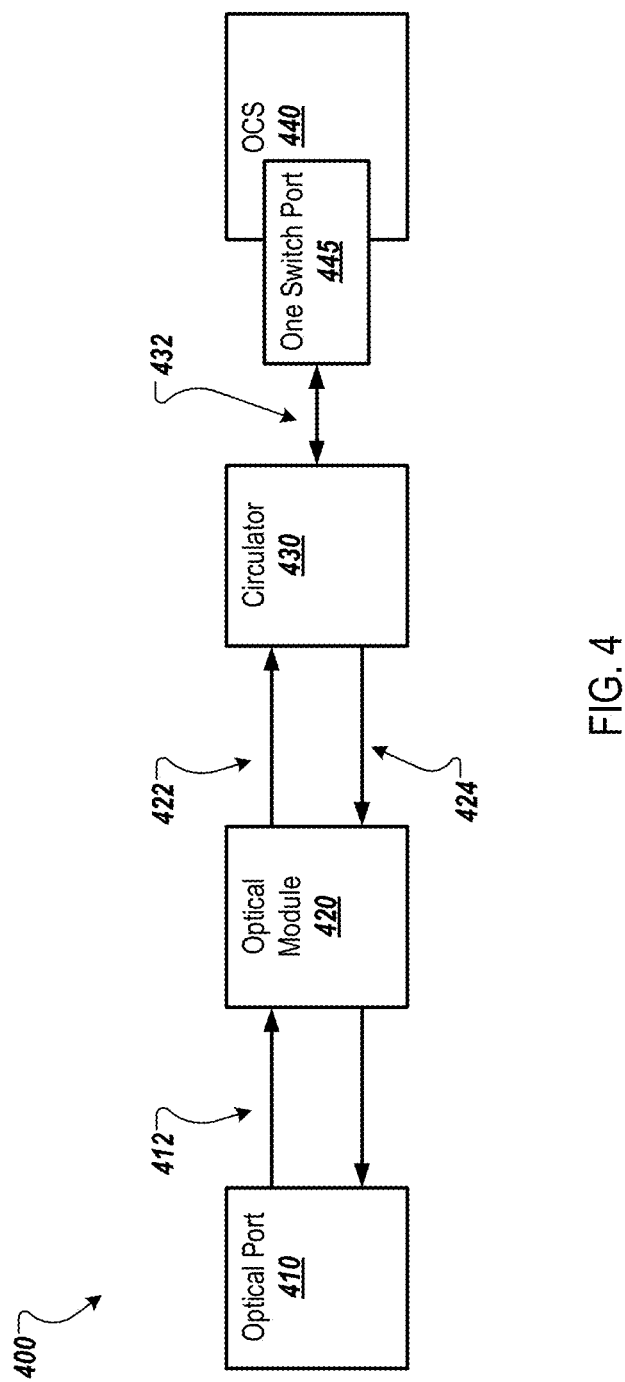
FIG. 4 illustrates an example optical link from a compute node to an optical circuit switching (OCS) switch.

FIG. 4 illustrates an example optical link 400 from a compute node to an OCS switch. The compute nodes of the superpods can be installed in trays of data center racks. Each compute node can include six high-speed electrical links. Two of the electrical links can be connected on a circuit board of the compute node and four can be routed to external electrical connectors, e.g., Octal Small Form Factor Pluggable (OSFP) connectors, that connect to a port 410, e.g., an OSFP port. In this example, the port 410 is connected to an optical module 420 by electrical contacts 412. The optical module 420 can convert the electrical links to optical links to extend the length of the external links, e.g., to over one kilometer (km) to provide data communication between the compute nodes in a large data center, if needed. The type of optical module can vary based on the required lengths between the building blocks and the OCS switches, as well as the desired speed and bandwidth of the links.

The optical module 420 is connected to a circulator 430 by fiber optic cables 422 and 424. The fiber optic cables 422 can include one or more fiber optic cables for transmitting data from the optical module 420 to the circulator 430. The fiber optic cables 424 can include one or more fiber optic cables for receiving data from the circulator 430. For example, the fiber optic cables 422 and 424 can include bi-directional optical fibers or pairs of unidirectional TX/RX optical fibers. The circulator 430 can reduce the number of fiber optic cables (e.g., from two pairs to a single pair of fiber optic cables 432 by converting from unidirectional optical fibers to bidirectional optical fibers. This aligns well with a single OCS port 445 of an OCS switch 440, which typically accommodates a pair of optical paths (2 fibers) that are switched together. In some implementations, the circulator 430 can be integrated into the optical module 420 or omitted from the optical link 400.

Figure 5:
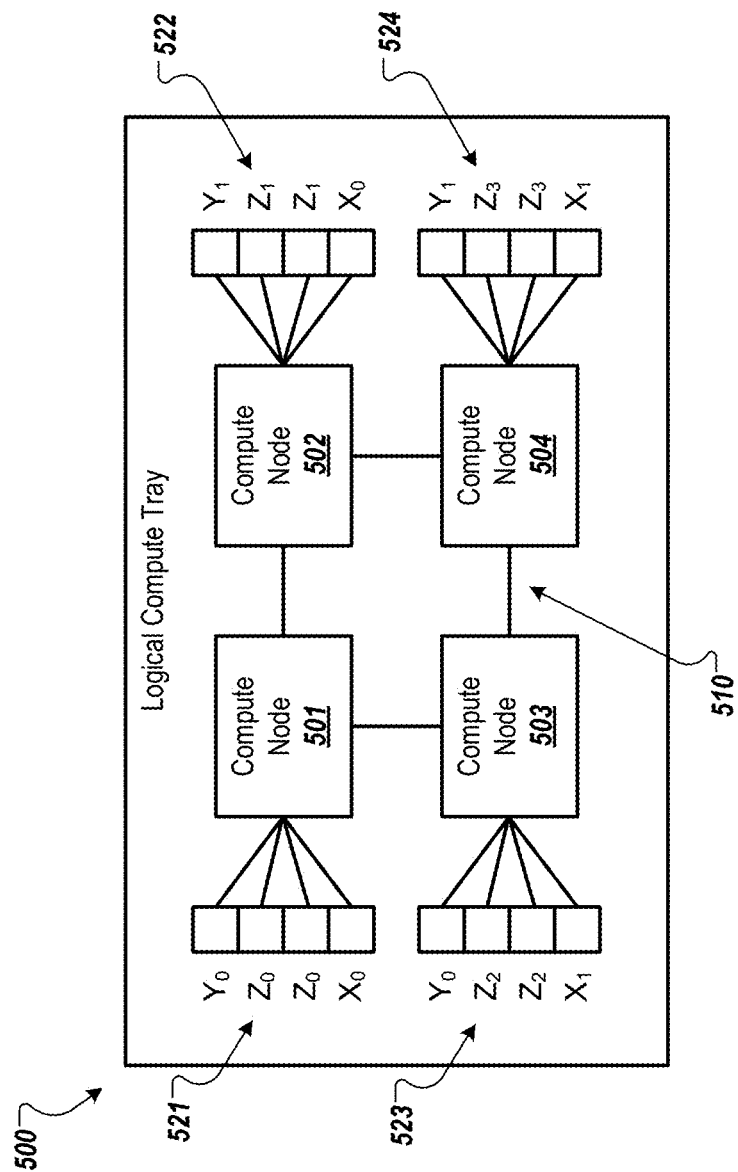
FIG. 5 illustrates a logical compute tray for forming a building block.
Figure 6:
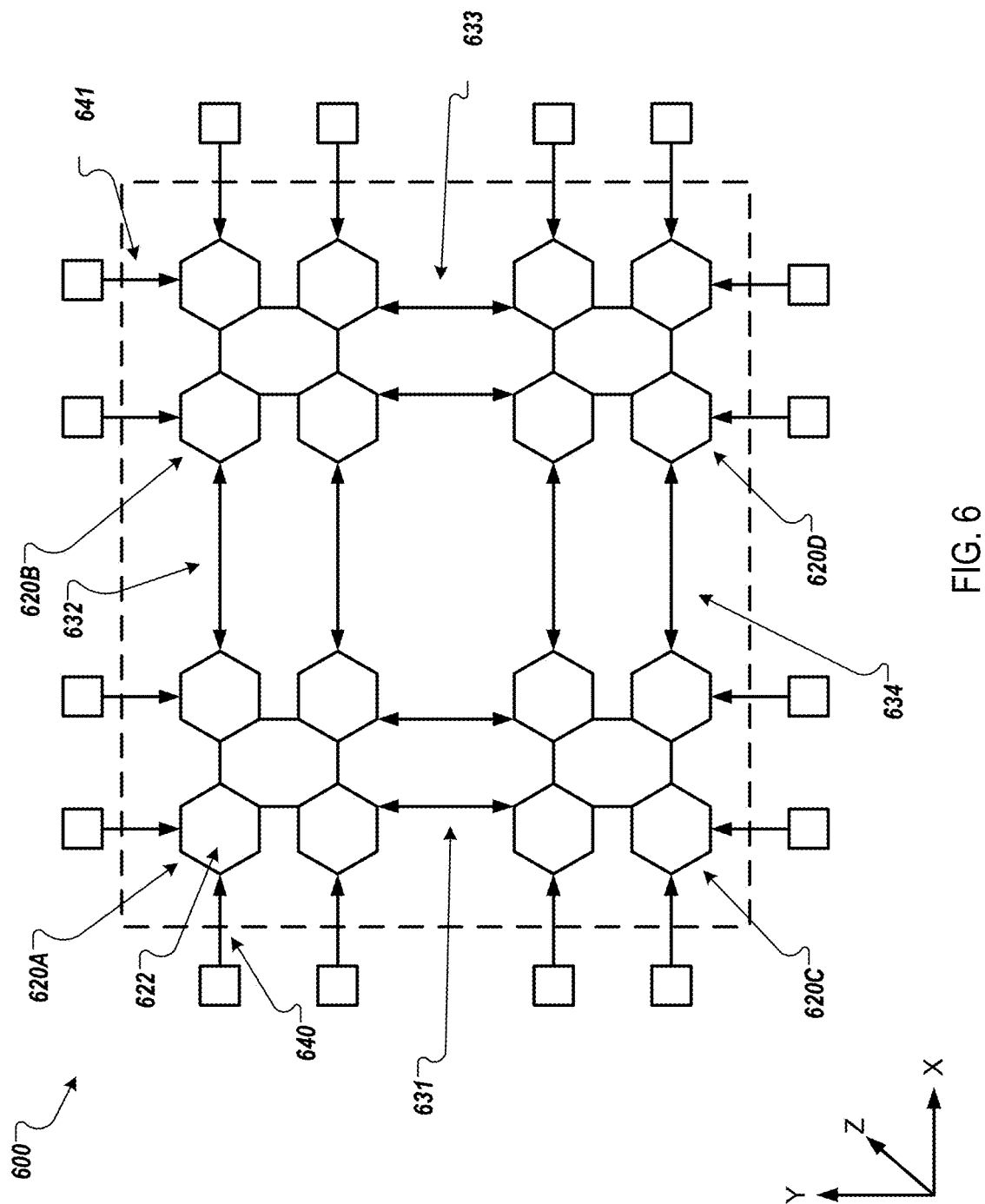
FIG. 6 illustrates a sub-block of an example building block with one dimension omitted.
Figure 7:
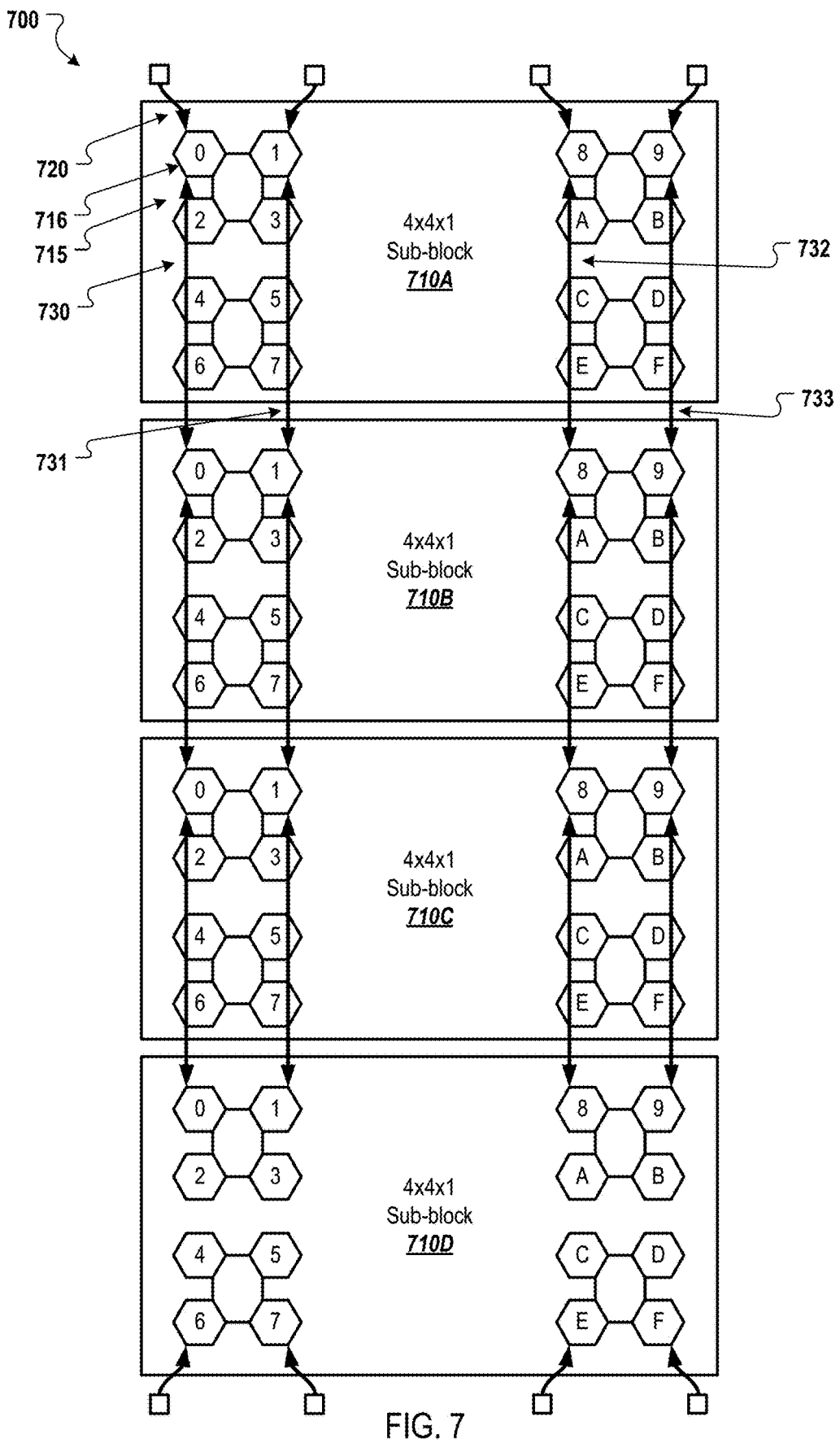
FIG. 7 illustrates an example building block.

FIGS. 5-7 illustrate how a 4×4×4 building block is formed using multiple compute trays. Similar techniques can be used to form other sizes and shapes of building blocks.

FIG. 5 illustrates a logical compute tray 500 for forming a 4×4×4 building block. The base hardware block of a 4×4×4 building block is a single compute tray 500 that has a 2×2×1 topology. In this example, the compute tray 500 has two compute nodes along the x-dimension, two nodes along the y-dimension, and one node along the z-dimension. For example, compute nodes 501 and 502 form an x-dimension segment and compute nodes 503 and 504 form an x-dimension segment. Similarly, compute nodes 501 and 503 form a y-dimension segment and compute nodes 502 and 504 for a y-dimension segment.

Each compute node 501-504 is connected to two other compute nodes using internal links 510, e.g., copper cables or traces on a printed circuit board. Each compute node is also connected to four external ports. The compute node 501 is connected to external ports 521. Similarly, the compute node 502 is connected to external ports 522, the compute node 503 is connected to external ports 523, and the compute node 504 is connected to external ports 524. The external ports 521-524 can be OSFP or other ports that connect the compute nodes to OCS switches, as described above. The ports can accommodate either an electrical copper or fiber optic module attached to a fiber optic cable.

The external ports 521-524 for each compute node 501-504 has an x-dimension port, a y-dimension node, and two z-dimension nodes. This is because each compute node 501-504 is already connected to another compute node in the x-dimension and in the y-dimension using the internal links 510. Having two z-dimension external ports allow each compute node 501-504 to also connect to two compute nodes along the z-dimension.

FIG. 6 illustrates a sub-block 600 of an example building block with one dimension (the z-dimension) omitted. In particular, the sub-block 600 is a 4×4×1 block formed by a 2×2 arrangement of compute trays, e.g., a 2×2 arrangement of the compute trays 500 of FIG. 1. The sub-block 600 includes four compute trays 620A-620D in a 2×2 arrangement. Each compute tray 620A-620D can be the same as the compute tray 500 of FIG. 5, including four compute nodes 622 in a 2×2×1 arrangement.

The compute nodes 622 of the compute trays 620A-620D can be connected using internal links 631-634, e.g., copper cables. For example, two compute nodes 622 of the compute tray 620A are connected along the y-dimension to two compute nodes 622 of the compute tray 620B using internal links 632.

Two compute nodes 622 of each compute tray 620A-620D are also connected to external links 640 along the x-dimension. Similarly, two compute nodes of each compute tray 620A-620D are also connected to external lines 641 along the y-dimension. In particular the compute nodes at the end of each x-dimension segment and the end of each y-dimension segment is connected to an external link 640. These external links 640 can be fiber optic cables that connect the compute nodes, and thus the building block that includes the compute nodes, to OCS switches, e.g., using the optical link 400 of FIG. 4.

The 4×4×4 building block can be formed by connecting four of the sub-blocks 600 together along the z-dimension. For example, the compute nodes 622 of each compute tray 620A-620A can be connected using internal links to one or two corresponding compute nodes of compute trays on other sub-blocks 600 arranged in the z-dimension. The compute nodes at the end of each z-dimension segment can include an external link 640 that connects to an OCS switch, similar to the external links at the ends of the x-dimension and y-dimension segments.

FIG. 7 illustrates an example building block 700. The building block 700 includes four sub-blocks 710A-710D connected along the z-dimension. Each sub-block 710A-710D can be the same as the sub-block 600 of FIG. 6. FIG.

7 illustrates some of the connections between the sub-blocks 710A-710D along the z-dimension.

In particular, the building block 700 includes internal links 730-733 along the z-dimension between corresponding compute nodes 716 of compute trays 715 of the sub-blocks 710A-710D. For example, internal links 730 connect a segment of compute nodes 0 along the z-dimension. Similarly, internal links 731 connect a segment of compute nodes 1 along the z-dimension, internal links 732 connect a segment of compute nodes 8 along the z-dimension, and internal links 733 connect a segment of compute nodes 9 along the z-dimension. Although not shown, similar internal links connect the segments for compute nodes 2-7 and A-F.

The building block 700 also includes external links 720 at the end of each segment along the z-dimension. Although external links 720 are only shown for the segments of compute nodes 0, 1, 8, and 9, each other segment of compute nodes 2-7 and A-F also include external links 720. The external links can connect the segments to OCS switches, similar to the external links at the ends of the x-dimension and y-dimension segments.

Figure 8:
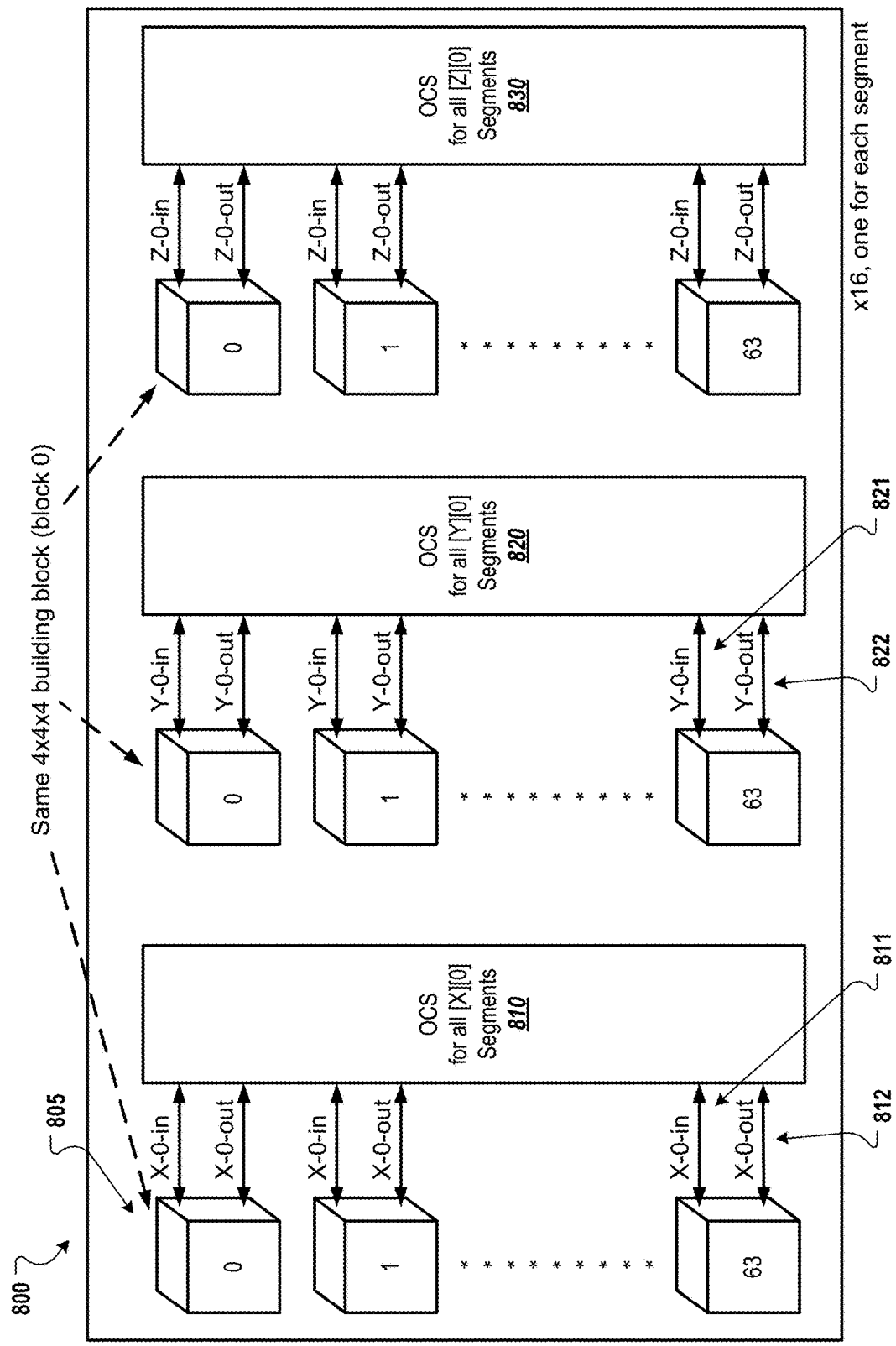
FIG. 8 illustrates an OCS fabric topology for a superpod.

FIG. 8 illustrates an OCS fabric topology 800 for a superpod. In this example, the OCS fabric topology includes a separate OCS switch for each segment along each dimension of 4×4×4 building blocks of a superpod that includes 64 building blocks 805, i.e., building blocks 0-63. A 4×4×4 building block 805 includes 16 segments along the x-dimension, 16 segments along the y-dimension, and 16 segments along the z-dimension. In this example, the OCS fabric topology includes 16 OCS switches for the x-dimension, 16 OCS switches for the y-dimension, and 16 OCS switches for the z-dimension, for a total of 48 OCS switches that can be configured to generate various workload clusters.

For the x-dimension, the OCS fabric topology 800 includes 16 OCS switches, including the OCS switch 810. Each building block 805 includes, for each segment along the x-dimension, an external input link 811 and an external output link 812 that are connected to the OCS switch 810 for that segment. These external links 811 and 812 can be the same as, or similar to, the optical link 400 of FIG. 4.

For the y-dimension, the OCS fabric topology 800 includes 16 OCS switches, including the OCS switch 820. Each building block 805 includes, for each segment along the y-dimension, an external input link 821 and an external output link 822 that are connected to the OCS switch 810 for that segment. These external links 821 and 822 can be the same as, or similar to, the optical link 400 of FIG. 4.

For the z-dimension, the OCS fabric topology 800 includes 16 OCS switches, including the OCS switch 830. Each building block 805 includes, for each segment along the z-dimension, an external input link 821 and an external output link 822 that are connected to the OCS switch 810 for that segment. These external links 821 and 822 can be the same as, or similar to, the optical link 400 of FIG. 4.

In other examples, multiple segments can share the same OCS switch, e.g., depending on the OCS radix and/or the number of building blocks in a superpod. For example, if an OCS switch has a sufficient number of ports for all x-dimension segments of all building blocks in a superpod, all of the x-dimension segments can be connected to the same OCS switch. In another example, two segments of each dimension can share an OCS switch if the OCS switch has a sufficient number of ports. However, by having the corresponding segments of all building blocks of a superpod connected to the same OCS switch enables data communication between the compute nodes of these segments using a single routing table. In addition, using separate OCS switches for each segment or each dimension can simplify troubleshooting and diagnostics. For example, if there are issues with data communication across a particular segment or dimension, it would be easier to identify the OCS that is potentially faulty than if multiple OCSs were used for the particular segment or dimension.

Figure 9:
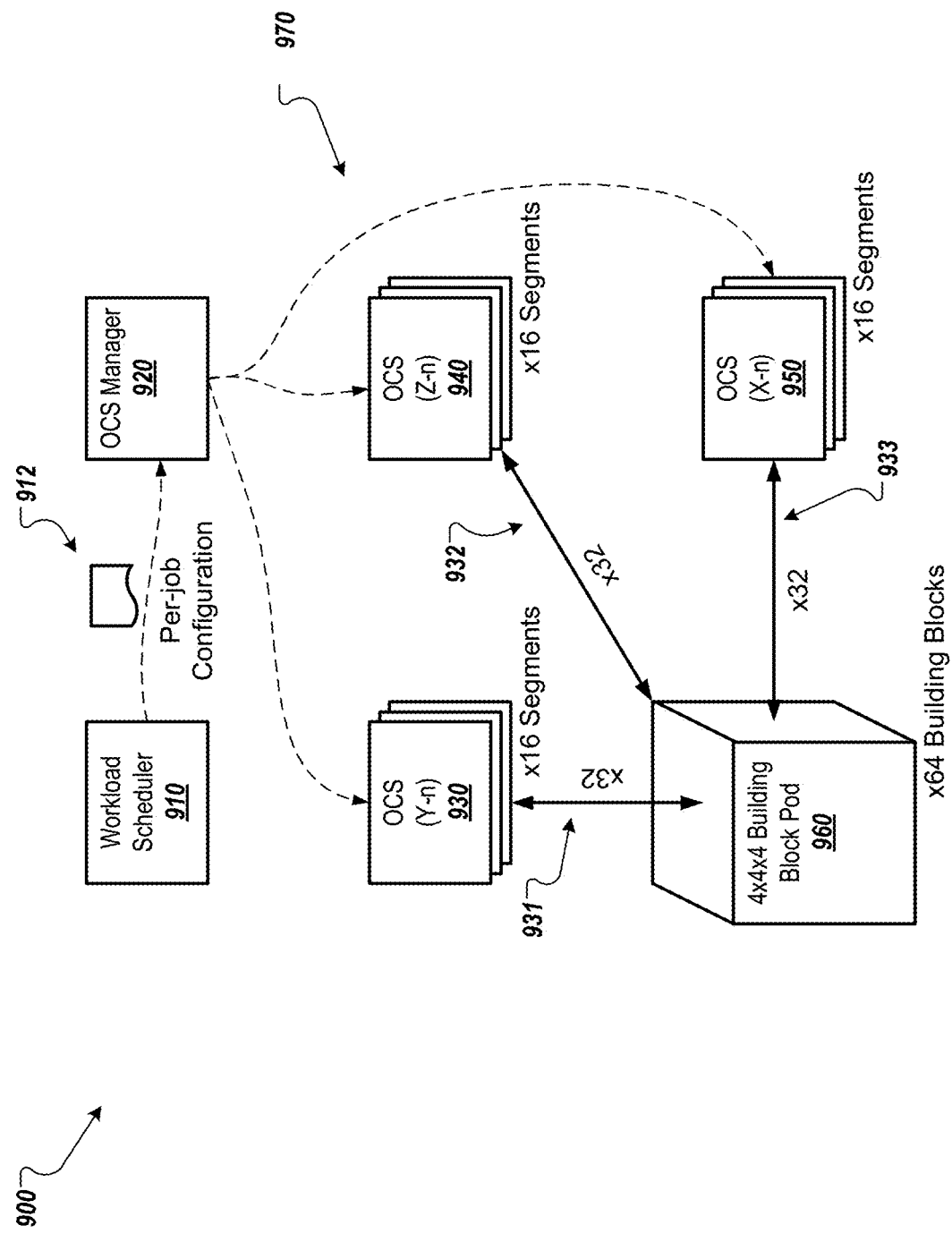
FIG. 9 illustrates components of an example superpod.

FIG. 9 illustrates components of an example superpod 900. For example, the superpod 900 can be one of the superpods of the processing system 130 of FIG. 1. The example superpod 900 includes 64 4×4×4 building blocks 960 that can used to generate workload clusters that execute computing workloads, e.g., machine learning workloads. As described above, each 4×4×4 building block 960 includes 32 compute nodes with four compute nodes arranged along each of three dimensions. For example, the building blocks 960 can be the same as, or similar to, the building block 310, the workload cluster 320, or the building block 700 described above.

The example superpod 900 includes an optical network 970 that includes 48 OCS switches 930, 940, and 950 that are connected to the building blocks using 96 external links 931, 932, and 933 for each building block 960. Each external link can be a fiber optic link, similar to or the same as, the optical link 400 of FIG. 4.

The optical network 970 includes an OCS switch for each segment of each dimension of each building block, similar to the OCS fabric topology 800 of FIG. 8. For the x-dimension, the optical network 970 includes 16 OCS switches 950, one for each segment along the x-dimension. The optical network 970 also includes, for each building block 960, an input external link and an output external link for each segment of the building block 960 along the x-dimension. These external links connect the compute nodes on the segment to the OCS switch 950 for the segment. As each building block 960 includes 16 segments along the x-dimension, the optical network 970 includes 32 external links 933 (i.e., 16 input and 16 output links) that connect the x-dimension segments of each building block 960 to the corresponding OCS switches 950 for the segments.

For the y-dimension, the optical network 970 includes 16 OCS switches 930, one for each segment along the y-dimension. The optical network 970 also includes, for each building block 960, an input external link and an output external link for each segment of the building block 960 along the y-dimension. These external links connect the compute nodes on the segment to the OCS switch 930 for the segment. As each building block 960 includes 16 segments along the y-dimension, the optical network 970 includes 32 external links 931 (i.e., 16 input and 16 output links) that connect the y-dimension segments of each building block 960 to the corresponding OCS switches 930 for the segments.

For the z-dimension, the optical network 970 includes 16 OCS switches 932, one for each segment along the z-dimension. The optical network 970 also includes, for each building block 960, an input external link and an output external link for each segment of the building block 960 along the z-dimension. These external links connect the compute nodes on the segment to the OCS switch 940 for the segment. As each building block 960 includes 16 segments along the z-dimension, the optical network 970 includes 32 external links 932 (i.e., 16 input and 16 output links) that connect the z-dimension segments of each building block 960 to the corresponding OCS switches 940 for the segments.

The workload scheduler 910 can receive request data that includes a workload and data specifying a requested cluster of building blocks 960 for executing the workload. The request data can also include a priority for the workload. The priority can be expressed in levels, e.g., high, medium, or low, or numerically, e.g., in the range of 1-100 or another appropriate range. For example, the workload scheduler 910 can receive the request data from a user device or a cell scheduler, e.g., the user device 110 or the cell scheduler 140 of FIG. 1. As described above, the request data can specify a target n-dimensional arrangement of the compute nodes, e.g., a target arrangement of building blocks that include the compute nodes.

The workload scheduler 910 can select a set building blocks 960 to generate a workload cluster that matches the target arrangement specified by the request data. For example, the workload scheduler 910 can identify, in the superpod 900, a set of available healthy building blocks. An available healthy building block is a building block that is not executing another workload or part of a workload cluster and that is not failed.

For example, the workload scheduler 910 can maintain and update status data, e.g., in the form of a database, that indicates the status of each building block 960 in the superpod. The availability status for a building block 960 can indicate whether the building block 960 is assigned to a workload cluster. The health status for a building block 960 can indicate whether the building block is working or failed. The workload scheduler 910 can identify building blocks 960 that have an availability status that indicates that the building block 960 is not assigned to a workload and that has a health status of working. When a building block 960 is assigned to a workload, e.g., used to generate a workload cluster for the workload, or has a health status change, e.g., from working to failed or vice versa, the workload scheduler can update the status data for the building block 960 accordingly.

From the identified building blocks 960, the workload scheduler 910 can select a quantity of building blocks 960 that match the quantity defined by the target arrangement. If the request data specifies one or more types of compute nodes, the workload scheduler 910 can select, from the identified building blocks 960, the building blocks that have the requested type(s) of compute nodes. For example, if the request data specifies a 2×2 arrangement of building blocks with two building blocks of TPUs and two building blocks of GPUs, the workload scheduler 910 can select two available healthy building blocks that have TPUs and two healthy available building blocks that have GPUs.

The workload scheduler 910 can also select building blocks 960 based on a priority of each workload that is currently running in the superpod and a priority of the workload included in the request data. If the superpod 900 does not have enough available healthy building blocks to generate the workload cluster for the requested workload, the workload scheduler 910 can determine whether there are any workloads being executed in the superpod 900 that has a lower priority than the requested workload. If so, the workload scheduler 910 can reassign building blocks from the workload cluster(s) of one or more lower priority workloads to the workload cluster for the requested workload. For example, the workload scheduler 910 can either terminate the lower priority workload(s), delay the lower priority workload(s), or reduce the size of the workload clusters for the lower priority workload(s) to free up building blocks for the higher priority workload.

The workload scheduler 910 can reassign a building block from one workload cluster to another simply by reconfiguring the optical network (e.g., by configuring the OCS switches as described below) such that the building block is connected to the building blocks of the higher priority workload rather than the building blocks of the lower priority workload. Similarly, if a building block of a higher priority workload fails, the workload scheduler 910 can reassign a building block of the workload cluster for a lower priority workload to the workload cluster of the higher priority workload by reconfiguring the optical network.

The workload scheduler 910 can generate and provide per-job configuration data 912 to an OCS manager 920 of the superpod 900. The per-job configuration data 912 can specify the selected building blocks 960 for the workload and the arrangement of the building blocks. For example, if the arrangement is a 2×2 arrangement, the arrangement includes four spots for building blocks. The per-job configuration data can specify which selected building block 960 goes in each of the four spots.

The per-job configuration data 912 can identify the selected building blocks 960 using a logical identifier for each building block. For example, each building block 960 can include a unique logical identifier. In a particular example, the 64 building blocks 960 can be numbered 0-63 and these numbers can be the unique logical identifiers.

The OCS manager 920 uses the per-job configuration data 912 to configure the OCS switches 930, 940, and/or 950 to generate a workload cluster that matches the arrangement specified by the per-job configuration data. Each OCS switch 930, 940, and 950 includes a routing table that is used to route data between physical ports of the OCS switch. For example, assume that an output external link for an x-dimension segment of a first building block is connected to the input external link for the corresponding x-dimension segment of a second building block. In this example, the routing table of the OCS switch 950 for this x-dimension segment will indicate that the data between the physical ports of the OCS switch to which these segments are connected is to be routed between each other.

The OCS manager 920 can maintain port data that maps each port of each OCS switch 920, 930, and 940 to each logical port of each building block. For each x-dimension segment of a building block, this port data can specify which physical port of an OCS switch 950 the external input link is connected and which physical port of the OCS switch 950 the external output link is connected. The port data can include the same data for each dimension of each building block 960 of the superpod 900.

The OCS manager 920 can use this port data to configure the routing tables of the OCS switches 930, 940, and/or 950 to generate the workload cluster for the workload. For example, assume that a first building block is going to be connected to a second building block in a 2×1 arrangement with the first building block on the left of the second building block in the x-dimension. The OCS manager 920 would update the routing tables of the OCS switches 950 for the x-dimension to route data between the x-dimension segments of the first building block and the second building block. As each x-dimension segment of the building blocks will need to be connected, the OCS manager 920 can update the routing table of each OCS switch 950.

For each x-dimension segment, the OCS manager 920 can update the routing table for the OCS switch 950 for the segment. In particular, the OCS manager 920 can update the routing table to map the physical port of the OCS switch 950 to which the segment of the first building block is connected to the physical port of the OCS switch to which the segment of the second building block is connected. As each x-dimension segment includes an input and output link, the OCS manager 920 can update the routing table such that the input link of the first building block is connected to the output link of the second building block and the output link of the first building block is connected to the input link of the second building block.

The OCS manager 920 can update the routing tables by obtaining a current routing table from each OCS switch. The OCS manager 920 can update the appropriate routing tables and send the updated routing tables to the appropriate OCS switches. In another example, the OCS manager 920 can send update data specifying the updates to the OCS switches and the OCS switches can update their routing tables according to the update data.

After the OCS switches are configured with their updated routing tables, the workload cluster is generated. The workload scheduler 910 can then cause the workload to be executed by the compute nodes of the workload cluster. For example, the workload scheduler 910 can provide the workload to the compute nodes of the workload cluster for execution.

After the workload is completed, the workload scheduler 910 can update the status of each building block that was used to generate the workload cluster back to available. The workload scheduler 910 can also instruct the OCS manager 920 to remove the connections between the building blocks that were used to generate the workload cluster. In turn, the OCS manager 920 can update the routing tables to remove the mappings between the physical ports of the OCS switches that were used to route data between the building blocks.

Using OCS switches to configure the optical fabric topology to generate workload clusters for workloads in this manner enables superpods to host multiple workloads in a dynamic and secure fashion. The workload scheduler 920 can generate and terminate workload clusters on the fly as new workloads are received and workloads are completed. The routing between segments provided by the OCS switches are provides better security between different workloads being executed in the same superpod than conventional supercomputers. For example, the OCS switches decouple the workloads from each other physically with an air gap between workloads. Conventional supercomputers use software that provides the isolation between workloads, which is more susceptible to data breaches.

Figure 10:
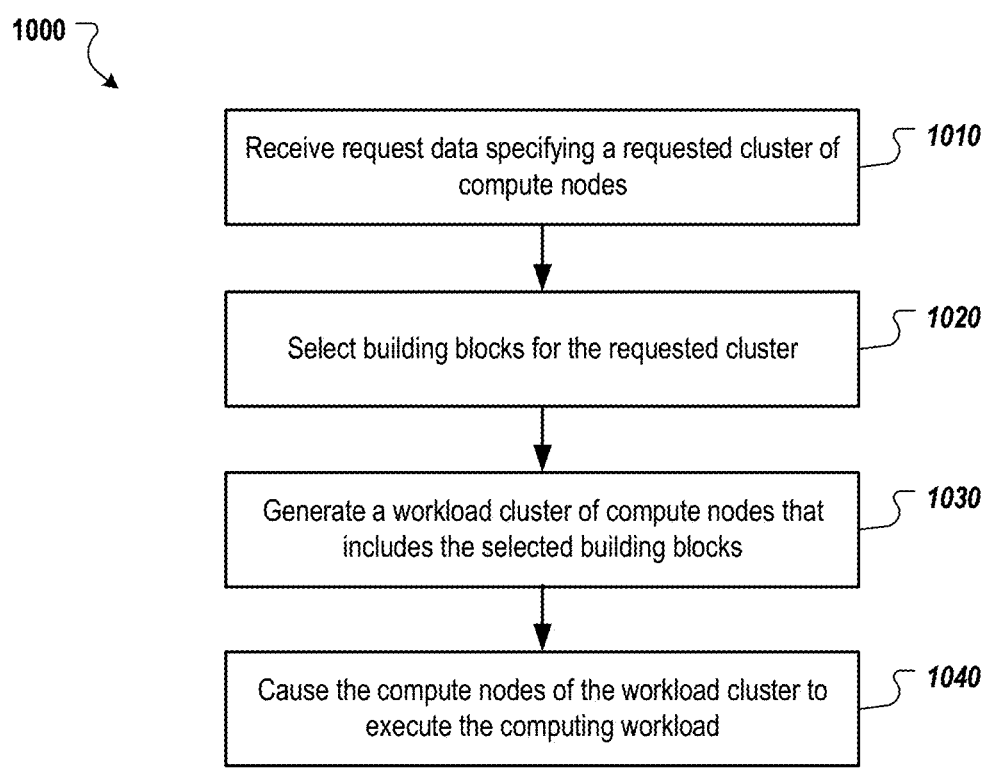
FIG. 10 is a flow diagram that illustrates an example process for generating a workload cluster and executing a computing workload using the workload cluster.

FIG. 10 is a flow diagram that illustrates an example process 1000 for generating a workload cluster and executing a computing workload using the workload cluster. Operations of the process 1000 can be performed by a system that includes one or more data processing apparatus. For example, operations of the process 1000 can be performed by the processing system 130 of FIG. 1.

The system receives request data that specifies a requested cluster of compute nodes (1010). For example, the request data can be received from a user device. The request data can include a computing workload and data specifying a target n-dimensional arrangement of the compute nodes. For example, the request data can specify a target n-dimensional arrangement of building blocks that include the compute nodes.

In some implementations, the request data can also specify the types of compute nodes for the building blocks. A superpod can include building blocks with different types of compute nodes. For example, a superpod can include 90 building blocks that each include a 4×4×4 arrangement of TPUs and 10 special purpose building blocks that include a 2×1 arrangement of special purpose compute nodes. The request data can specify the quantity of building blocks of each type of compute node and the arrangement of these building blocks.

The system selects, from a superpod that includes a set of building blocks, a subset of the building blocks for the requested cluster (1020). As described above, the superpod can include a set of building blocks that have a three-dimensional arrangement of compute nodes, e.g., a 4×4×4 arrangement of compute nodes. The system can select a quantity of building blocks that match the quantity defined by the target arrangement. As described above, the system can select building blocks that are healthy and available for the requested cluster.

The subset of building blocks can be a proper subset of the building blocks. A proper subset is a subset that does not include all members of the set. For example, less than all of the building blocks may be required to generate a workload cluster that matches the target arrangement of compute nodes.

The system generates a workload cluster that includes the selected subset of compute nodes (1030). The workload cluster can have an arrangement of building blocks that match the target arrangement specified by the request data. For example, if the request data specifies a 4×8×4 arrangement of compute nodes, the workload cluster can include two building blocks arranged like the workload cluster 330 of FIG. 3.

To generate the workload cluster, the system can configure routing data for each dimension of the workload cluster. For example, as described above, a superpod can include an optical network that includes one or more OCS switches for each dimension of the building blocks. The routing data for a dimension can include a routing table for one or more OCS switches. As described above with reference to FIG. 9, the routing tables of the OCS switches can be configured to route data between the appropriate segments of compute nodes along each dimension.

The system causes the compute nodes of the workload cluster to execute the computing workload (1040). For example, the system can provide the computing workload to the computing nodes of the workload cluster. While the computing workload is being executed, the configured OCS switches can route data between the building blocks of the workload cluster. The configured OCS switches can route the data between the computing nodes of the building blocks as if the computing nodes were physically connected in the target arrangement although the computing nodes are not physically connected in that arrangement.

For example, the compute nodes of each segment of a dimension can communicate data across the OCS switch to the other compute nodes of that segment that are in different building blocks as if the compute nodes in that segment were physically connected in a single physical segment. This differs from packet switched networks as this configuration of a workload cluster provides a true end-to-end light path between corresponding segments with no packet switching or buffering in the middle. In packet switching, there is added latency as the packets need to be received by a switch, buffered, and transmitted again on another port.

After the computing workload is completed, the system can release the building blocks for other workloads, e.g., by updating the status of the building blocks to an available status and updating the routing data to no longer route data between the building blocks of the workload cluster.

Figure 11:
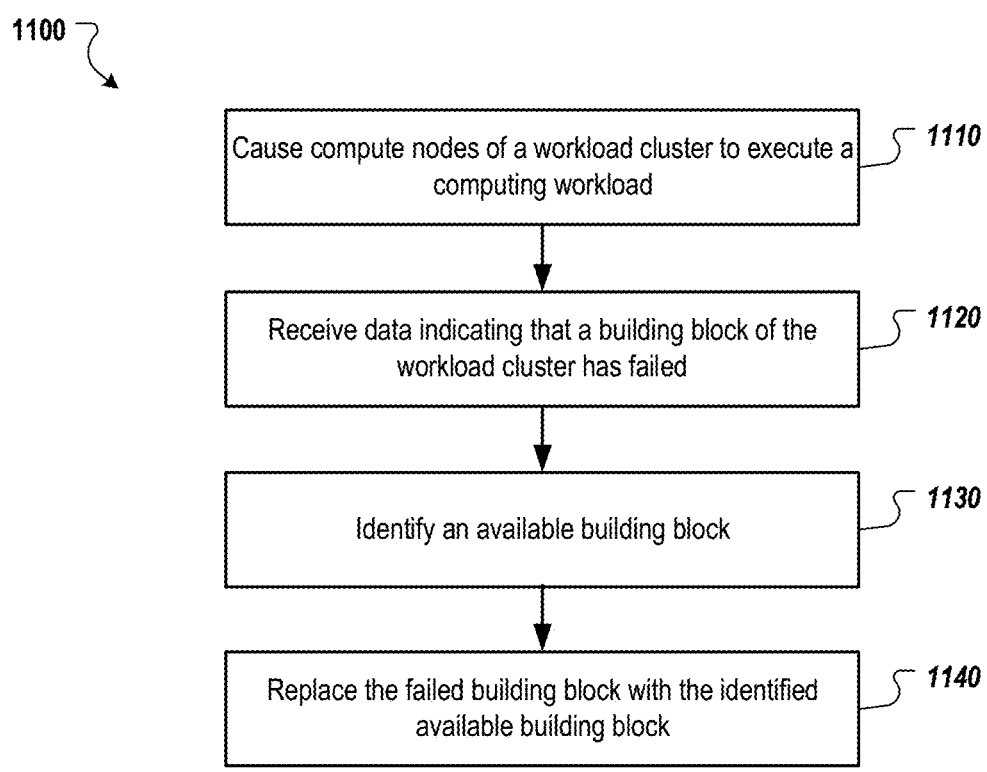
FIG. 11 is a flow diagram that illustrates an example process for reconfiguring an optical network to replace a failed building block.

FIG. 11 is a flow diagram that illustrates an example process 1100 for reconfiguring an optical network to replace a failed building block. Operations of the process 1100 can be performed by a system that includes one or more data processing apparatus. For example, operations of the process 1100 can be performed by the processing system 130 of FIG. 1.

The system causes compute nodes of a workload cluster to execute a computing workload (1110). For example, the system can generate the workload cluster and cause the compute nodes to execute the computing workload using the process 1000 of FIG. 10.

The system receives data indicating that a building block of the workload cluster has failed (1120). For example, if one or more compute nodes of a building block fails, the another component, e.g., a monitoring component, can determine that the building block has failed and send, to the system, data indicating that the building block has failed.

The system identifies an available building block (1130). For example, the system can identify, in the same superpod as the other building blocks of the workload cluster, an available healthy building block. The system can identify the available healthy building block based on status data for the building blocks, e.g., that is maintained by the system.

The system replaces the failed building block with the identified available building block (1140). The system can update routing data of one or more OCS switches of an optical network that connects the building blocks to replace the failed building block with the identified available building block. For example, the system can update the routing table of one or more OCS switches to remove the connections between the other building blocks of the workload cluster and the failed building block. The system can also update the routing table of one or more OCS switches to connect the identified building block to the other building blocks of the workload cluster.

The system can logically arrange the identified building block in the logical spot of the failed building block spot. As described above, the routing table of an OCS switch can map the physical port of the OCS switch that is connected to a segment of a building block to the physical port of the OCS switch that is connected to the corresponding segment of another building block. In this example, the system can make the replacement by updating the mapping to the corresponding segments of the identified available building block rather than the failed building block.

For example, assume that the input external link for a particular x-dimension segment of the failed building block is connected to a first port of an OCS switch and the input external link for the corresponding x-dimension segment of the identified available building block is connected to a second port of the OCS switch. Also assume that the routing table maps the first port to a third port of the OCS switch, which is connected to the corresponding x-dimension segment of another building block. To make the replacement, the system can update the mapping of the routing table to map the second port to the third port rather than mapping the first port to the third port. The system can do this for each segment of the failed building block.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more data processing apparatus, the method comprising:
   identifying a target arrangement of compute nodes for executing a computing workload;
   generating a workload cluster of compute nodes having an arrangement that matches the target arrangement of compute nodes, the generating comprising:
      configuring, for each dimension of n-dimensions, one or more optical circuit switches of an optical network for the dimension such that compute nodes of a plurality of building blocks arranged in the dimension communicate with each other through the one or more optical circuit switches for the dimension, wherein the plurality of building blocks are communicatively coupled to the optical network, wherein each building block includes an n-dimensional arrangement of compute nodes with multiple compute nodes being arranged in each dimension of the n-dimensions, and wherein n is greater than or equal to two; and
   causing the compute nodes of the workload cluster to execute the computing workload.

2. The method of claim 1, wherein configuring the one or more optical circuit switches for each dimension comprises configuring respective routing data for the one or more optical circuit switches for each dimension, the respective routing data specifying how data of the computing workload is routed between compute nodes along the dimension.

3. The method of claim 1, further comprising:
selecting, as the plurality of building blocks, a subset of building blocks from a set of building blocks for the computing workload.

4. The method of claim 1, wherein each building block includes a plurality of segments of compute nodes along each dimension of the n-dimensions, and the optical network includes a respective optical circuit switch for each segment of each dimension of the plurality of building blocks.

5. The method of claim 1, wherein each building block comprises one of a three-dimensional torus of compute nodes or a mesh of compute nodes.

6. The method of claim 1, further comprising:
receiving data indicating that a given building block of the workload cluster has failed; and
replacing the given building block with an available building block of the plurality of building blocks, the replacing comprising reconfiguring the one or more optical circuit switches in corresponding one or more dimensions such that the computing nodes of the available building block communicate with other compute nodes of the workload cluster in the corresponding one or more dimensions.

7. The method of claim 1, wherein:
identifying the target arrangement of compute nodes for executing the computing workload comprises receiving request data specifies the target arrangement of compute nodes and different types of compute nodes to be included in the target arrangement of compute nodes.

8. The method of claim 7, further comprising: determining, for each type of compute node specified by the request data, a building block that includes one or more compute nodes of the type of compute node.

9. A system, comprising:
a data processing apparatus; and
a computer storage medium encoded with a computer program, the computer program comprising data processing apparatus instructions that when executed by the data processing apparatus cause the data processing apparatus to perform operations, the operations comprising:
identifying a target arrangement of compute nodes for executing a computing workload;
generating a workload cluster of compute nodes having an arrangement that matches the target arrangement of compute nodes, the generating comprising:
configuring, for each dimension of n-dimensions, one or more optical circuit switches of an optical network for the dimension such that compute nodes of a plurality of building blocks arranged in the dimension communicate with each other through the one or more optical circuit switches for the dimension, wherein the plurality of building blocks are communicatively coupled to the optical network, wherein each building block includes an n-dimensional arrangement of compute nodes with multiple compute nodes being arranged in each dimension of the n-dimensions, and wherein n is greater than or equal to two; and
causing the compute nodes of the workload cluster to execute the computing workload.

10. The system of claim 9, wherein configuring the one or more optical circuit switches for each dimension comprises configuring respective routing data for the one or more optical circuit switches for each dimension, the respective routing data specifying how data of the computing workload is routed between compute nodes along the dimension.

11. The system of claim 9, wherein the operations further comprise:
selecting, as the plurality of building blocks, a subset of building blocks from a set of building blocks for the computing workload.

12. The system of claim 9, wherein each building block includes a plurality of segments of compute nodes along each dimension of the n-dimensions, and the optical network includes a respective optical circuit switch for each segment of each dimension of the plurality of building blocks.

13. The system of claim 9, wherein each building block comprises one of a three-dimensional torus of compute nodes or a mesh of compute nodes.

14. The system of claim 9, wherein the operations further comprise:
receiving data indicating that a given building block of the workload cluster has failed; and
replacing the given building block with an available building block of the plurality of building blocks, the replacing comprising reconfiguring the one or more optical circuit switches in corresponding one or more dimensions such that the computing nodes of the available building block communicate with other compute nodes of the workload cluster in the corresponding one or more dimensions.

15. The system of claim 9, wherein:
identifying the target arrangement of compute nodes for executing the computing workload comprises receiving request data specifies the target arrangement of compute nodes and different types of compute nodes to be included in the target arrangement of compute nodes.

16. The system of claim 15, wherein the operations further comprise: determining, for each type of compute node specified by the request data, a building block that includes one or more compute nodes of the type of compute node.

17. A non-transitory computer storage medium encoded with a computer program, the computer program comprising instructions that when executed by one or more data processing apparatus cause the one or more data processing apparatus to perform operations, the operations comprising:
identifying a target arrangement of compute nodes for executing a computing workload;
generating a workload cluster of compute nodes having an arrangement that matches the target arrangement of compute nodes, the generating comprising:
configuring, for each dimension of n-dimensions, one or more optical circuit switches of an optical network for the dimension such that compute nodes of a plurality of building blocks arranged in the dimension communicate with each other through the one or more optical circuit switches for the dimension, wherein the plurality of building blocks are communicatively coupled to the optical network, wherein each building block includes an n-dimensional arrangement of compute nodes with multiple compute nodes being arranged in each dimension of the n-dimensions, and wherein n is greater than or equal to two; and
causing the compute nodes of the workload cluster to execute the computing workload.

18. The non-transitory computer storage medium of claim 17, wherein configuring the one or more optical circuit switches for each dimension comprises configuring respective routing data for the one or more optical circuit switches for each dimension, the respective routing data specifying how data of the computing workload is routed between compute nodes along the dimension.

19. The non-transitory computer storage medium of claim 17, wherein the operations further comprise:
selecting, as the plurality of building blocks, a subset of building blocks from a set of building blocks for the computing workload.

20. The non-transitory computer storage medium of claim 17, wherein each building block includes a plurality of segments of compute nodes along each dimension of the n-dimensions, and the optical network includes a respective optical circuit switch for each segment of each dimension of the plurality of building blocks.

* * * * *